(12) United States Patent
Kuno (10) Patent No.: US 8,717,379 B2
(45) Date of Patent: May 6, 2014

(54) COLOR CONVERSION TABLE CREATING DEVICE

(75) Inventor: Masashi Kuno, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 708 days.

(21) Appl. No.: 12/633,650

(22) Filed: Dec. 8, 2009

(65) Prior Publication Data

US 2010/0166306 A1  Jul. 1, 2010

(30) Foreign Application Priority Data

Dec. 25, 2008  (JP) ................................. 2008-331004

(51) Int. Cl.
*G09G 5/02* (2006.01)
(52) U.S. Cl.
USPC ........... 345/601; 345/589; 345/590; 345/591; 345/600; 345/602; 345/603; 345/604
(58) Field of Classification Search
USPC .................. 345/589–591, 600–604; 358/504, 358/518–521; 382/167
See application file for complete search history.

(56) References Cited

U.S. PATENT DOCUMENTS

| 6,061,501 | A  | * | 5/2000 | Decker et al. .................. 358/1.9 |
| 7,116,441 | B1 | * | 10/2006 | Matsuoka ....................... 358/1.9 |
| 8,009,325 | B1 | * | 8/2011 | Borg .............................. 358/1.9 |

(Continued)

FOREIGN PATENT DOCUMENTS

| JP | 2003-324619 A | 11/2003 |
| JP | 2004-159307 A | 6/2004 |

(Continued)

OTHER PUBLICATIONS

Japan Patent Office, Office Action for Patent Application No. JP 2008-331004 (counterpart to above-captioned patent application), mailed Dec. 21, 2010.

*Primary Examiner* — Ke Xiao
*Assistant Examiner* — Kim-Thanh T Tran
(74) *Attorney, Agent, or Firm* — Baker Botts L.L.P.

(57) ABSTRACT

A color conversion table creating device for creating a color conversion table for converting first color data defined in a first color space to second color data defined in a second color space different from the first color space, includes a first data acquiring unit, a reference value determining unit, a lightness judging unit, a third data determining unit, and a creating unit. The first data acquiring unit is configured to acquire a plurality of sets of first data defined in the first color space. The first data sets are determined by measuring test patches each corresponding to a set of second data defined in the second color space. The first data sets include a set of black color data corresponding to data representing black in the second color space. Each first data set has a lightness value. The reference value determining unit is configured to determine a reference value based on a lightness value of the black color data set. The lightness judging unit is configured to judge, for each first data set, whether or not a lightness value of the subject first data set is smaller than the reference value. The third data determining unit is configured to determine the first data set as a set of third data when the lightness judging unit judges that the lightness value of the first data set is smaller than the reference value. The creating unit creates a color conversion table based on the first data sets excluding the third data set.

15 Claims, 8 Drawing Sheets

(56) References Cited

U.S. PATENT DOCUMENTS

2004/0223173 A1 11/2004 Arai
2005/0099431 A1* 5/2005 Herbert et al. ............... 345/601
2008/0239353 A1 10/2008 Hori et al.
2008/0239355 A1 10/2008 Goto et al.
2008/0239410 A1* 10/2008 Hashii et al. ................. 358/462
2008/0291476 A1* 11/2008 Higuchi ........................ 358/1.9

FOREIGN PATENT DOCUMENTS

| JP | 2006-180062 A | 7/2006 |
| JP | 2006-197457 A | 7/2006 |
| JP | 2006-237987 A | 9/2006 |
| JP | 2008-252698 A | 10/2008 |
| JP | 2008-252699 A | 10/2008 |
| JP | 2008-252700 A | 10/2008 |

* cited by examiner

COLOR CONVERSION TABLE CREATING DEVICE

CROSS REFERENCE TO RELATED APPLICATION

This application claims priority from Japanese Patent Application No. 2008-331004 filed Dec. 25, 2008. The entire content of the priority application is incorporated herein by reference.

TECHNICAL FIELD

The present invention relates to a color conversion table creating device.

BACKGROUND

In order to reproduce matching colors across multiple devices, such as a printer and a monitor, a color conversion table is generally created for each device. One method of creating a color conversion table for a printer is to control the printer to print color patches on paper and to measure the color of each patch with a colorimeter in order to obtain numerical values for each color in the L*a*b* color space. Next, a color conversion table specifying correlations between numerical values in the RGB color space and numerical values in the L*a*b* color space is created based on the relationship between known RGB values and measured values for color patches corresponding to the known RGB values. This color conversion table is then used to perform seamless color matching between devices.

However, using a color conversion table created according to the conventional method described above can potentially lead to the use of colors that are darker than the color representing black.

Figure 7:
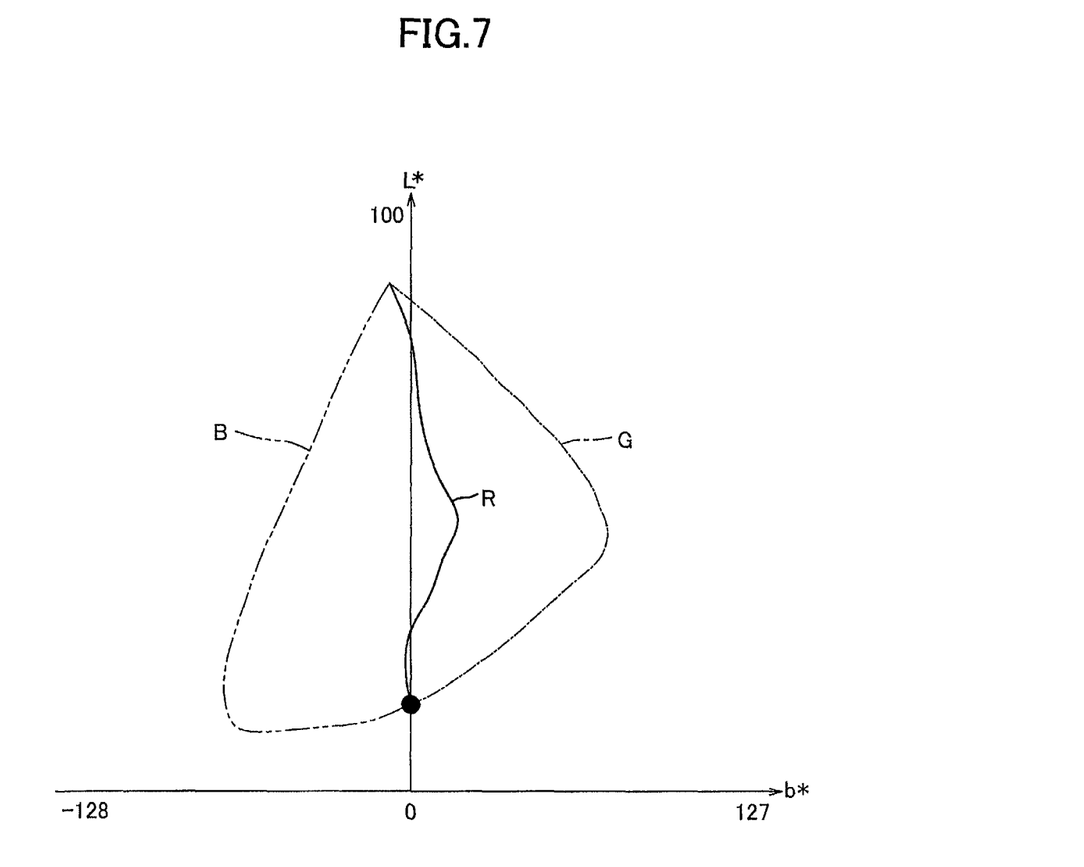
FIG. 7 is a graph illustrating RGB color gamut defined within L*a*b* color space according to a conventional color conversion table.

The graph shown in FIG. 7 illustrates RGB color gamuts defined within the L*a*b* color space according to the conventional color conversion table. For simplicity, the gamuts are rendered in the L*b* plane in FIG. 7. As shown in FIG. 7, the color gamut for blue (B) defined by the conventional color conversion table has a dark region that extends lower than the lightness (L* value) of black. It is possible to produce a color conversion table of this type when unconditionally using colorimetric values obtained by measuring color patches.

Thus, if Lab values are converted to RGB values using this color conversion table, the resulting color gamut will produce darker colors than black. Consequently, when an image is outputted based on RGB values obtained from this color conversion table, the resulting image having dark blue regions rendered in darker colors than black may appear unnatural.

Figure 8:
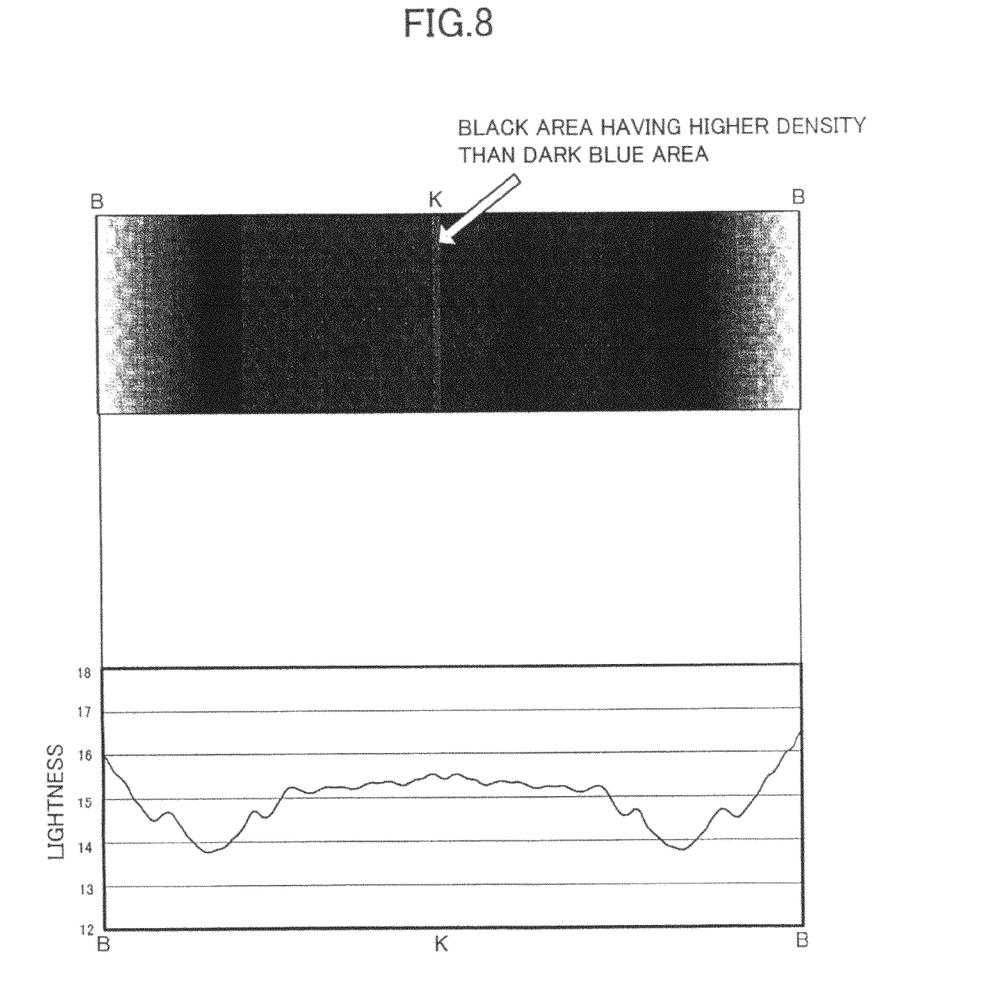
FIG. 8 is an explanatory diagram showing gradations from blue to black and from black to blue that are outputted from a printer based on the RGB values obtained using the conventional color conversion table, and measured lightness values obtained from these gradations.

FIG. 8 shows gradations from blue to black and from black to blue that are outputted from a printer based on the RGB values obtained using the conventional color conversion table, and the measured values obtained from these gradations. As shown in FIG. 8, if black is rendered with a higher lightness than that in the dark blue region, black areas formed adjacent to dark blue areas will appear to have a sheen. In the gradations shown in the upper part of FIG. 8, the shininess of the black region has been emphasized to clearly illustrate the phenomenon, but the shine may not appear as extreme as that shown in FIG. 8 in the actual printing results.

SUMMARY

In view of the foregoing, it is an object of the present invention to provide a color conversion table creating device, a method for creating a color conversion table, and a program for creating a color conversion table that are capable of restraining the use of colors that appear darker than black.

In order to attain the above and other objects, the invention provides a color conversion table creating device for creating a color conversion table for converting first color data defined in a first color space to second color data defined in a second color space different from the first color space. The color conversion table creating device includes a first data acquiring unit, a reference value determining unit, a lightness judging unit, a third data determining unit, and a creating unit. The first data acquiring unit is configured to acquire a plurality of sets of first data defined in the first color space. The first data sets are determined by measuring test patches each corresponding to a set of second data defined in the second color space. The first data sets include a set of black color data corresponding to data representing black in the second color space. Each first data set has a lightness value. The reference value determining unit is configured to determine a reference value based on a lightness value of the black color data set. The lightness judging unit is configured to judge, for each first data set, whether or not a lightness value of the subject first data set is smaller than the reference value. The third data determining unit is configured to determine the first data set as a set of third data when the lightness judging unit judges that the lightness value of the first data set is smaller than the reference value. The creating unit creates a color conversion table based on the first data sets excluding the third data set.

According to another aspect, the present invention provides a color conversion table creating method for creating a color conversion table for converting first color data defined in a first color space to second color data defined in a second color space different from the first color space. The color conversion table creating method includes: acquiring a plurality of sets of first data defined in the first color space, the first data sets being determined by measuring test patches each corresponding to a set of second data defined in the second color space, the first data sets including a set of black color data corresponding to data representing black in the second color space, each first data set having a lightness value; determining a reference value based on a lightness value of the black color data set; judging, for each first data set, whether or not a lightness value of the subject first data set is smaller than the reference value; determining the first data set as a set of third data when the lightness value of the first data set is smaller than the reference value; and creating a color conversion table based on the first data sets excluding the third data set.

According to another aspect, the present invention provides a computer-readable recording medium that stores a color conversion table creating program for creating a color conversion table for converting first color data defined in a first color space to second color data defined in a second color space different from the first color space. The color conversion table creating program includes instructions for: acquiring a plurality of sets of first data defined in the first color space, the first data sets being determined by measuring test patches each corresponding to a set of second data defined in the second color space, the first data sets including a set of black color data corresponding to data representing black in the second color space, each first data set having a lightness value; determining a reference value based on a lightness value of the black color data set; judging, for each first data set, whether or not a lightness value of the subject first data set is smaller than the reference value; determining the first data set as a set of third data when the lightness value of the first data set is smaller than the reference value; and creating a color conversion table based on the first data sets excluding the third data set.

BRIEF DESCRIPTION OF THE DRAWINGS

The particular features and advantages of the invention as well as other objects will become apparent from the following description taken in connection with the accompanying drawings, in which.

DETAILED DESCRIPTION

Figure 1:
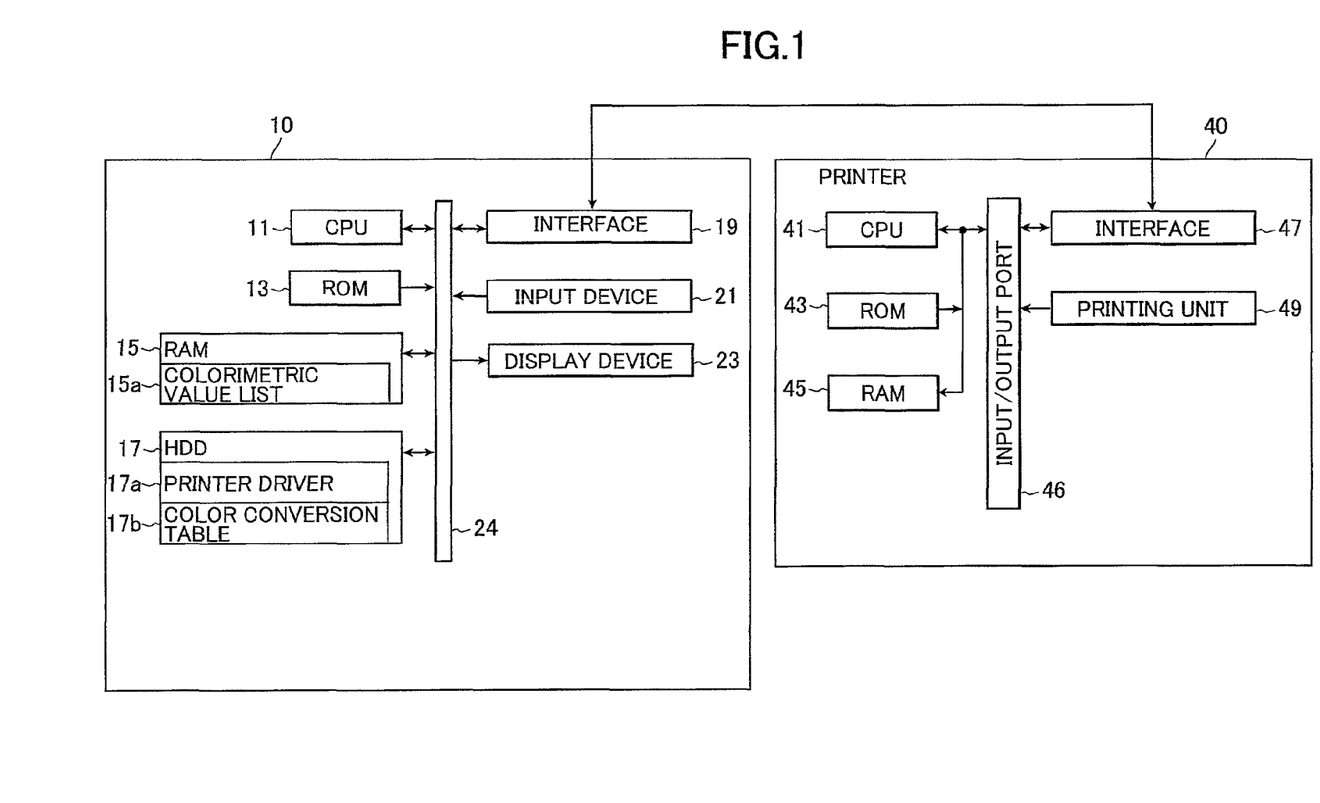
FIG. 1 is a block diagram showing a color conversion system including a color conversion table creating device according to a first embodiment of the present invention.

As shown in FIG. 1, a printing system 1 includes a personal computer 10 (PC 10) and a printer 40. The PC 10 includes a CPU 11, a ROM 13, a RAM 15, a hard disk drive (HDD) 17, an interface 19, an input device 21, and a display device 23. These components are connected to each other via a bus line 24.

The CPU 11 performs overall control of the PC 10 based on fixed values and programs stored in the ROM 13, the RAM 15, and the HDD 17. The ROM 13 stores programs for controlling various operations of the PC 10. The RAM 15 is a rewritable memory for temporarily storing various data used when the CPU 11 executes the above programs, and stores a colorimetric value list 15a. The colorimetric value list 15a records measured values based on the measured densities of color patches that are formed by the printer 40.

The HDD 17 stores a printer driver 17a and color conversion table 17b. The color conversion table 17b defines correlations between values expressing coordinates in the RGB color space and values expressing coordinates in the CIE L*a*b* color space and is created based on colorimetric values recorded in the colorimetric value list 15a. Values expressing coordinates in the RGB color space specifically denote values expressing the lightness values for R, G, and B and hereinafter will be referred to as RGB values. Similarly, the values expressing coordinates in the CIE L*a*b* color space specifically denote values expressing L* (hereinafter referred to as the L value), a* (hereinafter referred to as the a value), and b* (hereinafter referred to as the b value) and hereinafter will be referred to as Lab values. The color conversion table is used for converting color data defined in the L*a*b* color space to color data defined in the RGB color space.

The interface 19 transmits data to the printer 40. The input device 21 enables a user of the PC 10 to input instructions, and is configured of such as a keyboard, mouse, and the like. The display device 23 is capable of displaying various information representing contents of various process and inputted data.

The printer 40 is an inkjet printer and includes a CPU 41 serving as a microprocessor, a ROM 43 storing various control programs and data, a RAM 45, an interface 47, and a printing unit 49. These components are connected to an input/output port 46 via a bus line. The CPU 41 executes the programs for controlling various operations stored in the ROM 43. For example, the CPU 41 controls the printing unit to print an image on a recording sheet based on print data transmitted from the PC 10 via the interface 47. The RAM 45 is a rewritable memory for storing print data and control signals transmitted from the PC 10.

Figure 2:
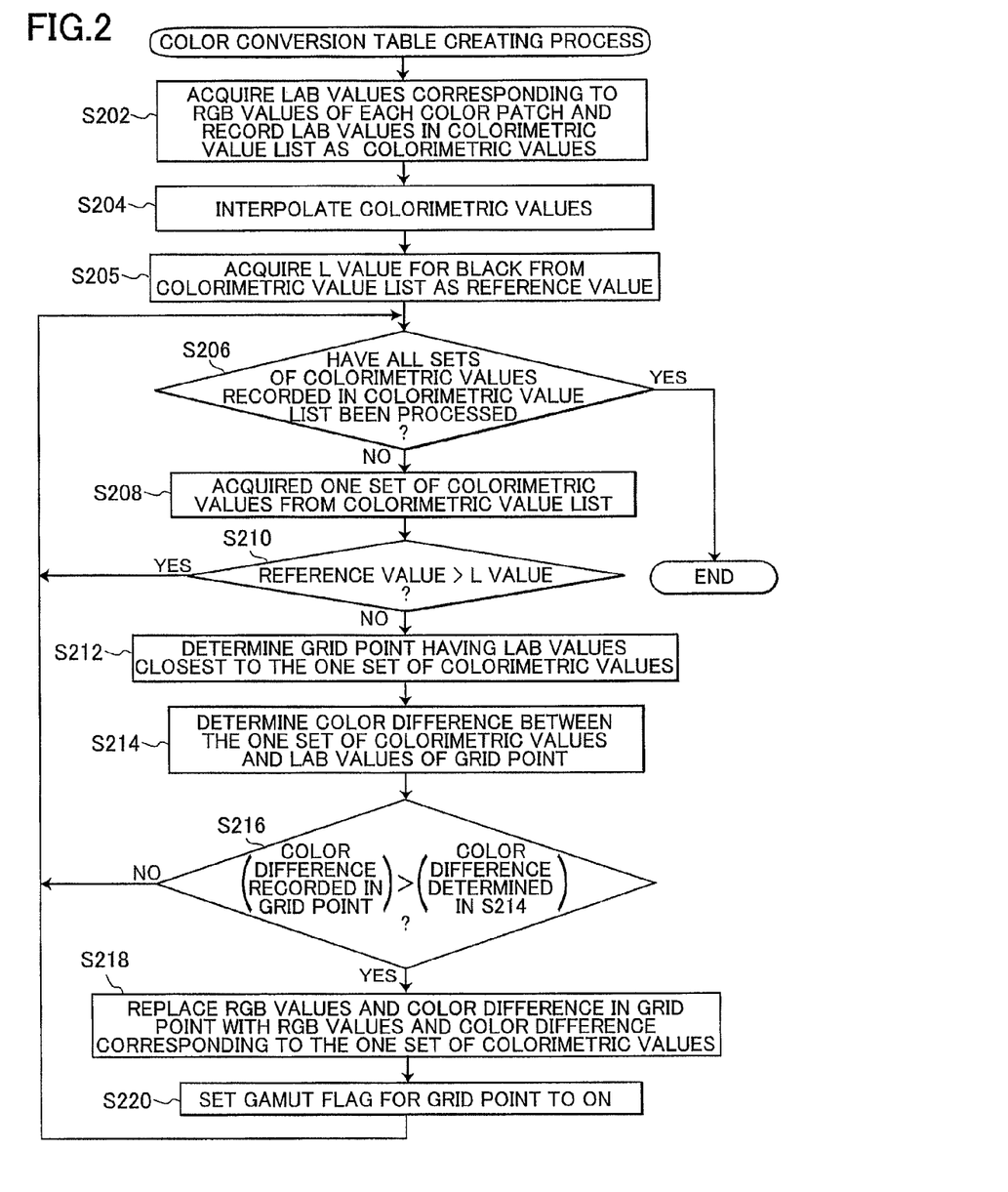
FIG. 2 is a flowchart illustrating steps in a color conversion table creating process executed by the color conversion table creating device according to the first embodiment.

FIG. 2 is a flowchart illustrating steps in a color conversion table creating process executed on the PC 10. The CPU 11 of the PC 10 performs this color conversion table creating process by executing the printer driver 17a in order to create the color conversion table 17b based on Lab values. Before performing the process in FIG. 2, the PC 10 controls the printer 40 to print 729 color patches for 729 combinations of RGB values. The RGB combinations are all permutations of RGB values when each value can be set to 0, 32, 64, 96, 128, 160, 192, 224, or 255. The 729 combinations of RGB values include data representing black (0, 0, 0).

In S202 at the beginning of the process in FIG. 2, the CPU 11 records a plurality of sets of Lab values (Lab data sets) corresponding to a plurality of sets of RGB values (RGB data sets) that are determined by measuring test patches with a colorimeter (not shown) in the colorimetric value list 15a as colorimetric values. The CPU 11 also records the known RGB values corresponding to the measured color patches in association with the respective colorimetric values. The Lab data sets include a set of black color data corresponding to black defined in the RGB color space.

In S204 the CPU 11 further divides the colorimetric values already recorded in the colorimetric value list 15a and records the results in the colorimetric value list 15a. In other words, the CPU 11 calculates a plurality of Lab values by interpolating Lab values of test patches. By performing steps S202 and S204, the CPU 11 acquires a plurality of sets of colorimetric values based on the values obtained when measuring the plurality of colors.

In S205 the CPU 11 reads the set of colorimetric values corresponding to RGB values for black from the colorimetric value list 15a and extracts the L value from the colorimetric values to be used as a reference value, and determines L value of the set of colorimetric values (black color data) as the reference value.

Figure 3A:
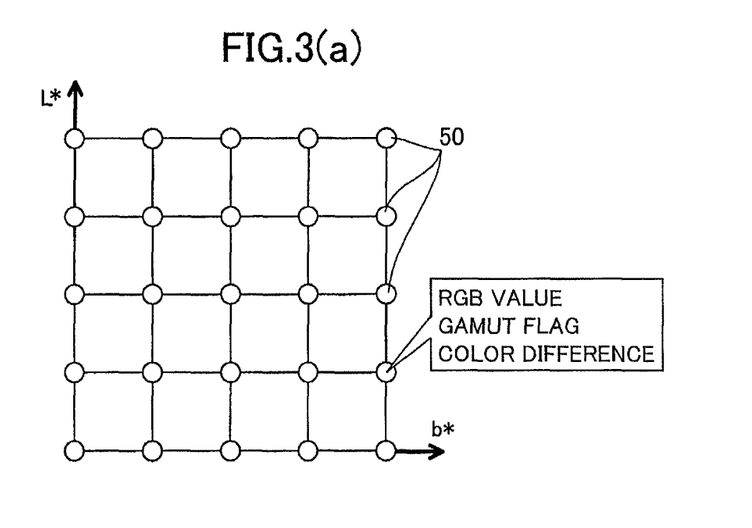
FIG. 3(a) is an explanatory diagram illustrating data configuration of color conversion table.

Here, an outline of the steps for creating the color conversion table 17b in the following process will be described with reference to FIGS. 3(a) and 3(b). As shown in FIG. 3(a), the color conversion table 17b includes RGB values, a color difference, and a gamut flag for each grid point 50 defined by dividing the CIE L*a*b* color space into equal segments. For the sake of description, the color conversion table 17b in FIG. 3(a) is rendered in the L*b* plane. Before beginning the color conversion table creating process, the CPU 11 initializes the color conversion table 17b by setting the gamut flag for each grid point 50 to OFF and by setting the color difference for each grid point 50 to a very high value.

The CPU 11 then creates the color conversion table 17b in the color conversion table creating process described with reference to FIG. 2 by associating each set of colorimetric values (Lab values) with the nearest grid point 50, and sets the gamut flag of the grid point 50 associated with the colorimetric values to ON. In other words, the CPU 11 creates the color conversion table 17b based on the colorimetric values associated with the grid point 50 set to ON. The CPU 11 also stores the difference between the Lab values expressed by the grid point 50 and the colorimetric values (Lab values) associated with the grid point 50 as the color difference of the grid point 50. Additionally, the RGB values corresponding to the colorimetric values associated with the grid point 50 are stored in association with the grid point 50.

Here, when 0≤L value ≤100 and −128≤a, b≤127, the grid point 50 should be configured so as to divide each of the L*, a*, and b* axes into about 17-33 segments in consideration for calculation precision as well as the required storage capacity and amount of calculations.

Returning to FIG. 2, in S206 the CPU 11 determines whether all sets of colorimetric values recorded in the colorimetric value list 15a have been processed. When there remain sets of colorimetric values to process (S206: NO), in S208 the CPU 11 reads one unprocessed set of colorimetric values from the colorimetric value list 15a.

In S210 the CPU 11 determines or judges whether the L value included in the set of colorimetric values read in S208 is smaller than the reference value. If the L value is not smaller than the reference value (S210: NO), in S212 the CPU 11 determines and selects a single grid point whose Lab values is closest to the processed set of colorimetric values.

In S214 the CPU 11 calculates the color difference between the colorimetric values (Lab values) currently being processed and the Lab values of the grid point 50 found to be nearest the colorimetric values. In S216, the CPU 11 determines whether or not the color difference currently recorded in the grid point 50 is greater than the color difference calculated in S214. If the color difference currently recorded in the grid point 50 is smaller than or equal to the calculated color difference (S216: NO), the CPU 11 returns to S206 and repeats the process described above.

However, if the color difference recorded in the grid point 50 is greater than the calculated color difference (S216: YES), in S218 the CPU 11 replaces RGB values and the color difference currently recorded in the nearest grid point 50 with the RGB values and color difference corresponding to the colorimetric values currently being processed, in S220 sets the gamut flag for the grid point 50 to ON, and subsequently returns to S206.

When the CPU 11 determines that all colorimetric values in the colorimetric value list 15a have been processed (S206: YES), the CPU 11 completes to create the color conversion table 17b based on the plurality of sets of colorimetric values excluding all sets of colorimetric values having an L value smaller than L value of the black and ends the color conversion table creating process. At the time, the CPU 11 corresponds, to each grid point 50 whose gamut flag to ON, the RGB values corresponding to colorimetric values closest to the subject grid point 50.

In the color conversion table creating process described above, the PC 10 can create a color conversion table 17b that excludes all colorimetric values recorded in the colorimetric value list 15a having an L value smaller than the L value of black color data.

Figure 3B:
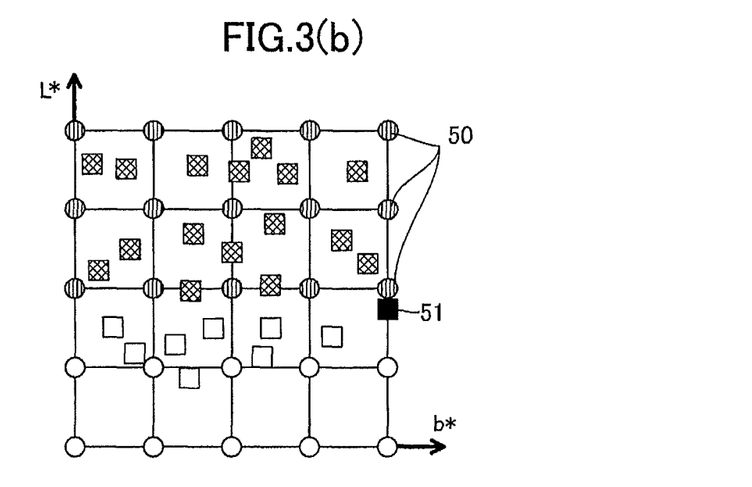
FIG. 3(b) is an explanatory diagram showing correlations between grid points and colorimetric values.

FIG. 3(b) conceptually illustrates the color conversion table 17b created according to the color conversion table creating process of the first embodiment. In FIG. 3(b), square icons represent colorimetric values, and the black square icon indicated by reference number 51 represents the colorimetric values for black defined in the RGB color space. Grid points 50 associated with colorimetric values have been shaded, while those not associated with colorimetric values are not.

As shown in FIG. 3(b), colorimetric values including an L value smaller than the L value of the black colorimetric values 51 (i.e., colorimetric values indicated by unshaded square icons) are not associated with grid points 50 in the color conversion table creating process of the first embodiment. Hence, the gamut flags of grid points 50 having an L value lower than that of the black colorimetric values 51 remain OFF. Consequently, the color conversion table 17b prevents the color gamut from extending to the region of smaller L values than that of black. In other words, colors having L values smaller than the L value of black are not included in the color gamut.

With this type of color conversion table 17b, the PC 10 can convert Lab values to RGB values using the RGB values associated with grid points 50. More specifically, the PC 10 identifies a plurality of grid points 50 near the target Lab values whose gamut flags are set to ON, finds RGB values corresponding to a position between the grid points 50 by performing cubic linear interpolation using the RGB values stored in the plurality of grid points 50, and converts the target Lab values to these RGB values.

All grid points 50 having a lightness value lower than that of the grid point 50 corresponding to black (R=0, G=0, B=0) in the color conversion table 17b are not used for color conversion since the gamut flags for these grid points 50 are set to OFF. Therefore, the color conversion table 17b restrains Lab values from being converted to RGB values corresponding to a darker color region than black. As a result, the PC 10 prevents the use of colors that appear darker than black in the image outputted based on the converted RGB values (for example, an image displayed on the monitor based on image data expressed in RGB values, or an image outputted on the printer based on image data acquired by converting RGB values to values in the CMY color space.

Figure 4:
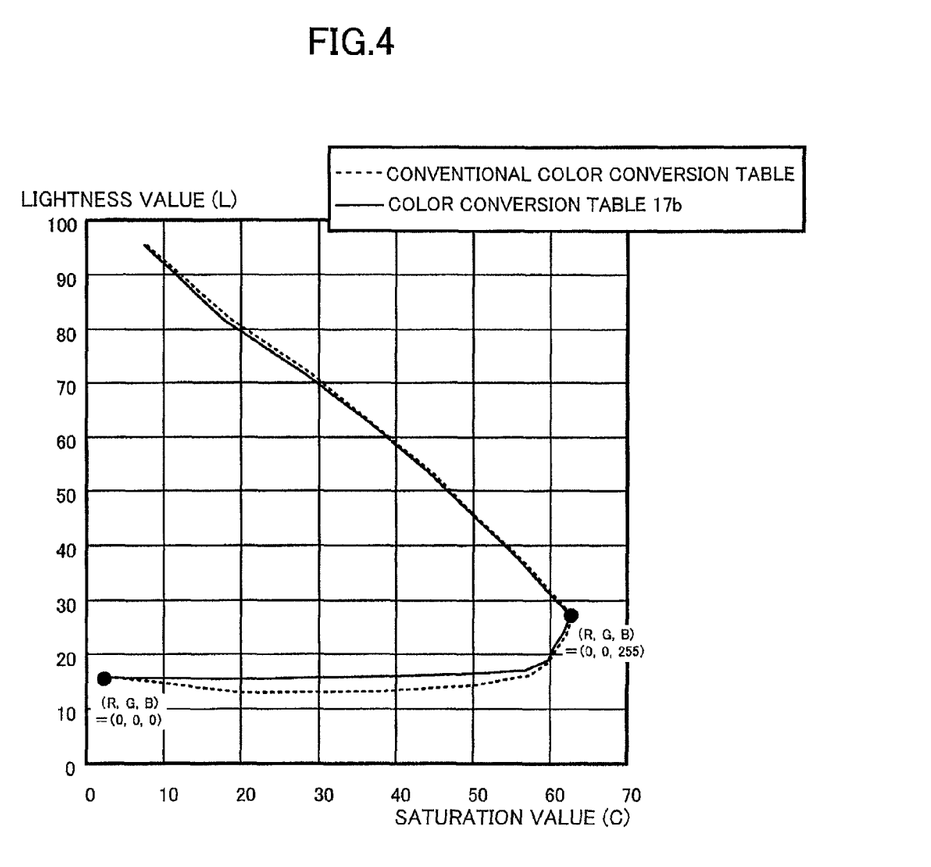
FIG. 4 is a graph comparing colors used in images outputted based on a color conversion table of the present invention and colors used in images outputted based on a conventional color conversion table.

FIG. 4 is a graph comparing colors used in images outputted based on the color conversion table 17b and colors used in images outputted based on a conventional color conversion table. In the graph of FIG. 4, measured results for gradations varying from white to blue and from blue to black are expressed in the LC plane.

As can be seen in FIG. 4, colors produced using the conventional color conversion table (indicated by the dotted line) in gradations from blue to black have a lower lightness than black. In other words, when converting Lab values to RGB values using the conventional color conversion table, Lab values expressing dark blue colors may be converted to RGB values rendering darker colors than the color rendered by Lab values depicting black. As a result, the dark blue regions may appear darker than black.

However, when converting Lab values to RGB values using the color conversion table 17b, as indicated by the solid line in FIG. 4, Lab values for dark blue regions are converted to RGB values depicting a similar darkness to that produced from the Lab values for black. As a result, the color conversion table 17b can restrain the use of colors that appear darker than black and can prevent the darkest regions of blue from appearing darker than black in gradations that grow gradually darker from blue to black.

Next, a second embodiment of the present invention will be described. In the first embodiment, the PC 10 creates the color conversion table 17b by comparing L values in colorimetric values to a reference value, regardless of the hue. However, the PC 10 according to the second embodiment compares the reference value only to L values in colorimetric values expressing colors classified as blue hues.

Figure 5:
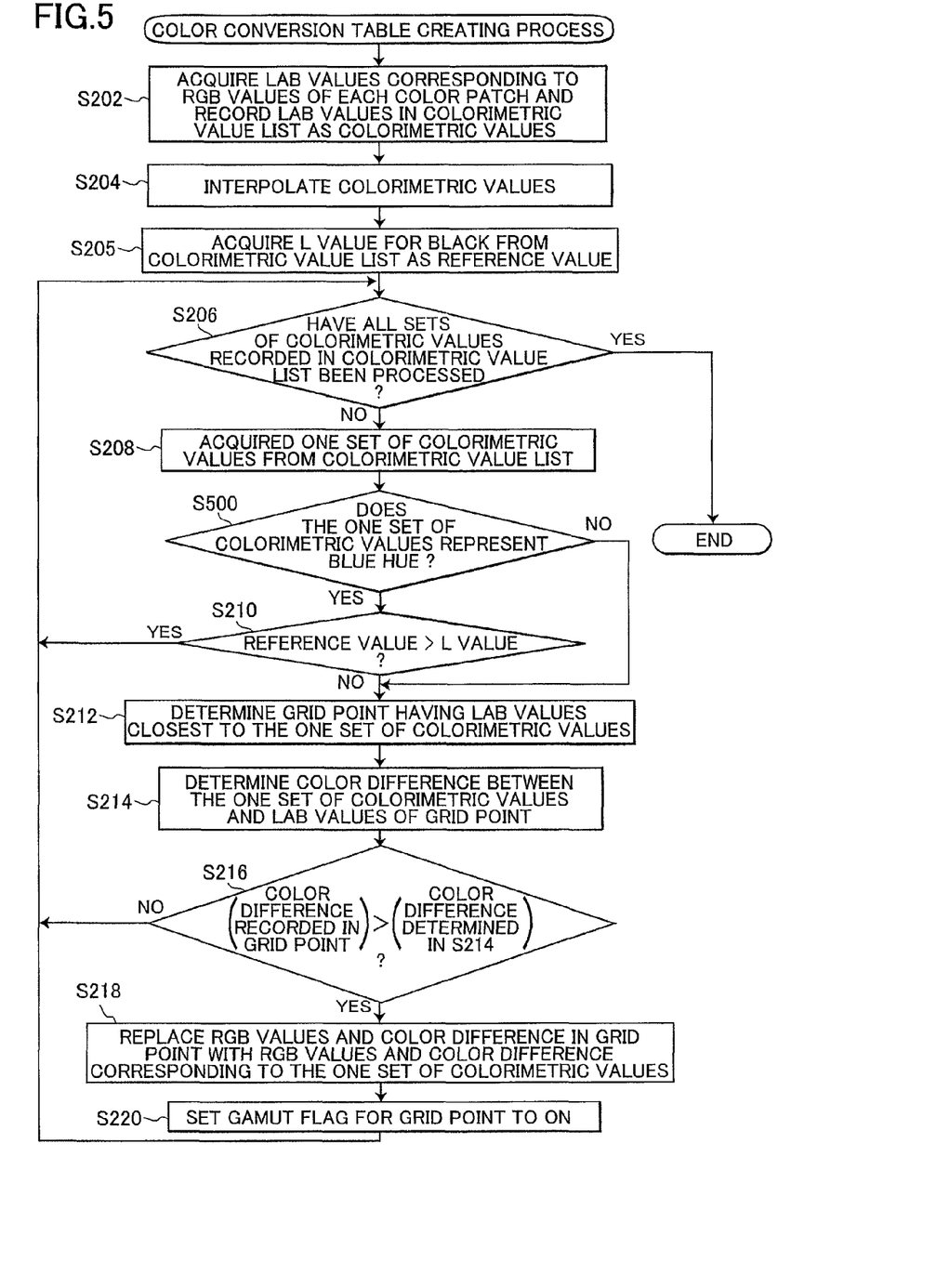
FIG. 5 is a flowchart illustrating steps in a color conversion table creating process executed by a color conversion table creating device according to a second embodiment.

In the second embodiment, the CPU 11 performs a color conversion table creating process shown in FIG. 5 instead of the color conversion table creating process shown in FIG. 2. The color conversion table creating process according to the second embodiment further includes a determination of S500 in addition to the color conversion table creating process according to the first embodiment.

After reading one set of colorimetric values in S208, in S500 the PC 10 according to the second embodiment determines whether the colorimetric values express a color classified as a blue hue. In other words, the CPU 10 determines whether or not each set of colorimetric values represents blue hue. Specifically, the PC 10 converts the colorimetric values (Lab values) to LCh values in the LCh color space. If the h value (hue angle) in the LCh values is within a 60-degree range from 270 degrees to 330 degrees, the PC 10 determines that the colorimetric values express a color classified as a blue hue. If the h value does not fall within this range, the PC 10 determines that the colorimetric values do not express a color in the blue hues. The hue angle h expressing the LCh hue increases in the counterclockwise direction, with the normal to a* being 0 degrees.

However, the present invention is not limited to this method for determining whether or not a set of colorimetric values represents blue hues. For example, the PC 10 may read RGB values corresponding to the colorimetric values and determine whether or not the colorimetric values represent blue hue based on the RGB values.

If the CPU 11 of the PC 10 determines that the set of colorimetric values represents blue hue (S500: YES), then in S210, as described in the first embodiment, the CPU 11 finds the nearest grid point 50 to these colorimetric values and subsequently performs a process to associate these colorimetric values with the grid point 50 under the condition that the color difference recorded for the grid point 50 is greater than the color difference with the colorimetric values currently being processed.

However, if the CPU 11 determines in 5500 that the colorimetric values do not express a color having a blue hue (S500: NO), the CPU 11 advances directly to S212, skipping S210. In other words, the CPU 11 only determines whether the L value in the colorimetric values is smaller than the reference value for colorimetric values in the colorimetric value list 15a expressing a color belong to blue hue.

Thus, in the color conversion table creating process according to the second embodiment, the PC 10 determines whether colorimetric values indicate blue hues and creates the color conversion table 17b that excludes colorimetric values having an L value smaller than the reference value.

In addition to the effects described in the first embodiment, the second embodiment can prevent reduction of the non-blue color gamut by determining whether L values are smaller than the reference value only for colorimetric values determined to express colors with blue hues.

While the invention has been described in detail with reference to the embodiments thereof, it would be apparent to those skilled in the art that various changes and modifications may be made therein without departing from the spirit of the invention.

For example, in S205 of FIGS. 2 and 5 according to the first and second embodiments, the CPU 11 acquires the L value for black as the reference value. However, the reference value may be set based on a lightness-related value found in colorimetric values obtained by measuring black. For example, prior to performing S205 in the color conversion table creating process of FIGS. 2 and 5, the CPU 11 may determine a black grid point to which the colorimetric values of black are associated and may extract an L value within a prescribed range from the black grid point to use as the reference value.

Figure 6:
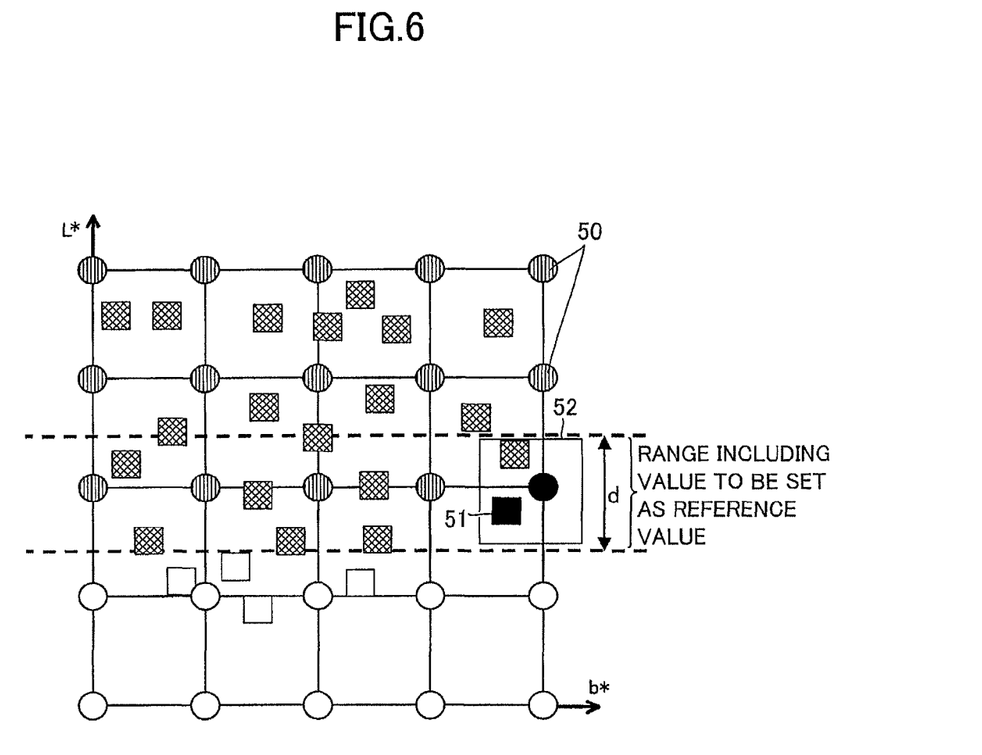
FIG. 6 is an explanatory diagram showing how to set a reference value.

FIG. 6 conceptually illustrates the color conversion table 17b according to this modification of the first and second embodiments. If a distance d represents the distance between grid points 50, colorimetric values used for matching within a cube 52 centered on a grid point 50 and having sides of length d is associated with the grid point 50 at the center of the cube 52. Therefore, the reference value may be set to the L value within a cube 52 centered on the black grid point (denoted by ● in FIG. 6) to which the black colorimetric values 51 is associated. Setting the reference value in this way can eliminate the use of colors associated with grid points 50 having a lower lightness than the black grid point 50.

Alternatively, in S205 described above, the CPU 11 may set the reference value to a value smaller than the L value of black by a prescribed amount. For example, the prescribed amount may be "1" when 0≤L value≤100. If colorimetric values having an L value smaller than the value obtained by subtracting 1 from the L value of black were used, the resulting color would appear darker than black. However, the inventors of the present invention discovered through experimentation that the difference between black and a dark color other than black is relatively unnoticeable when using colorimetric values having an L value greater than or equal to the value obtained by subtracting 1 from the L value of black.

Further, while the color conversion table 17b created according to the first and second embodiments defines correlations between values representing coordinates in the RGB color space and values representing coordinates in the CIE L*a*b* color space, the present invention may also be applied to a color conversion table defining correlations between values expressing coordinates in the RGB color space and values expressing coordinates in a different color space than the CIE L*a*b* color space, such as the CIECAM02 color space. In this case, the colorimetric values are JcaCb values. Accordingly, the same effects of the first and second embodiments can be obtained by creating a color conversion table that excludes colorimetric values having a smaller J value than the reference value, where the J value is equivalent to the L value in relation to lightness.

Further, the color conversion table creating process described in the first and second embodiments is executed according to the print driver 17a, but this process may be executed according to a special program for creating color conversion tables.

What is claimed is:

1. A color conversion table creating device for creating a color conversion table for converting first color data defined in an L*a*b* color space to second color data defined in an RGB color space, comprising:
 a processor configured to provide functional units including:
  a first data acquiring unit configured to acquire a plurality of sets of first data defined in the L*a*b* color space, the first data sets being determined by measuring test patches each corresponding to a set of second data defined in the RGB color space, the first data sets including a single set of black color data corresponding to data representing black at coordinate (0, 0, 0) in the RGB color space, each first data set of the first data sets having a measured lightness value;
a reference value determining unit configured to determine, as a reference value, a measured lightness value of the single set of black color data;
a lightness judging unit configured to judge, for each first data set of the first data sets, whether or not a measured lightness value of the subject first data set is smaller than the reference value;
a third data determining unit configured to determine the subject first data set as a set of third data when the lightness judging unit judges that the measured lightness value of the subject first data set is smaller than the reference value; and
a creating unit configured to create a color conversion table for converting the first color data defined in the L*a*b* color space to the second color data defined in the RGB color space based on the first data sets excluding the third data set.

2. The color conversion table creating device according to claim 1, wherein a plurality of grid points are defined in the L*a*b* color space, each grid point having a set of grid data defined in the L*a*b* color space,
wherein the processor is further configured to provide:
a grid point selecting unit configured to select, for each of the first data sets excluding the third data set, a single grid point whose grid data set is closest to the subject first data set, the grid points including a black grid point whose grid data is closest to the single set of black color data; and
a grid data corresponding unit configured to correspond, to each selected grid point, the second data set corresponding to the first data set that is closest to the grid data set of the subject grid point, and
wherein the creating unit is configured to create the color conversion table based on the grid data sets and the second data sets.

3. The color conversion table creating device according to claim 2, wherein the each grid data set has a lightness value, and
wherein the reference value determining unit is configured to determine, as the reference value, the measured lightness value of the single set of black color data when the measured lightness value of the single set of black color data falls within a prescribed range from the lightness value of the grid data set of black grid point.

4. The color conversion table creating device according to claim 1, wherein the processor is further configured to provide a hue judging unit configured to judge, for each first data set of the first data sets, whether or not the subject first data set represents blue hue, and
wherein the third data determining unit is configured to determine, for each first data set of the first data sets, the subject first data set as the third data set when the hue judging unit judges the subject first data set represents blue hue and the lightness judging unit judges that the measured lightness value of the subject first data set is smaller than the reference value.

5. A color conversion table creating method for creating a color conversion table for converting first color data defined in an L*a*b* color space to second color data defined in an RGB color space, the color conversion table creating method comprising:
(a) acquiring a plurality of sets of first data defined in the L*a*b* color space, the first data sets being determined by measuring test patches each corresponding to a set of second data defined in the RGB color space, the first data sets including a single set of black color data corresponding to data representing black at coordinate (0, 0, 0) in the RGB color space, each first data set of the first data sets having a measured lightness value;
(b) determining, as a reference value, a measured lightness value of the single set of black color data;
(c) judging, for each first data set of the first data sets, whether or not a measured lightness value of the subject first data set is smaller than the reference value;
(d) determining the subject first data set as a set of third data when the measured lightness value of the subject first data set is smaller than the reference value; and
(e) creating, using a color conversion table creating device, a color conversion table for converting the first color data defined in the L*a*b* color space to the second color data defined in the RGB color space based on the first data sets excluding the third data set.

6. The color conversion table creating method according to claim 5, wherein a plurality of grid points are defined in the L*a*b* color space, each grid point having a set of grid data defined in the L*a*b* color space,
wherein the color conversion table creating method further comprises:
(f) selecting, for each of the first data sets excluding the third data set, a single grid point whose grid data set is closest to the subject set of first data, the grid points including a black grid point whose grid data is closest to the single set of black color data; and
(g) corresponding, to each selected grid point, the second data set corresponding to the first data set that is closest to the subject grid point, and
wherein the (e) creating creates the color conversion table based on the grid data sets and the second data sets.

7. The color conversion table creating method according to claim 6, wherein the each grid data set has a lightness value, and
wherein the (b) determining determines, as the reference value, the measured lightness value of the single set of black color data when the measured lightness value of the single set of black color data falls within a prescribed range from the lightness value of the grid data set of black grid point.

8. The color conversion table creating method according to claim 5, further comprising (h) judging, for each first data set of the first data sets, whether or not the subject first data set represents blue hue, and
wherein the (d) determining determines, for each first data set of the first data sets, the subject first data set as the third data set when the (h) judging judges that the subject first data set represents blue hue and the (c) judging judges that the measured lightness value of the subject first data set is smaller than the reference value.

9. A non-transitory computer-readable recording medium that stores a color conversion table creating program for creating a color conversion table for converting first color data defined in an L*a*b* color space to second color data defined in an RGB color space, the color conversion table creating program comprising instructions for:
(a) acquiring a plurality of sets of first data defined in the L*a*b* color space, the first data sets being determined by measuring test patches each corresponding to a set of second data defined in the RGB color space, the first data sets including a single set of black color data corresponding to data representing black at coordinate (0, 0, 0) in the RGB color space, each first data set of the first data sets having a measured lightness value;

(b) determining, as a reference value, a measured lightness value of the single set of black color data;

(c) judging, for each first data set of the first data sets, whether or not a measured lightness value of the subject first data set is smaller than the reference value;

(d) determining the subject first data set as a set of third data when the measured lightness value of the subject first data set is smaller than the reference value; and (e) creating a color conversion table for converting the first color data defined in the L*a*b* color space to the second color data defined in the RGB color space based on the first data sets excluding the third data set.

10. The non-transitory computer-readable recording medium according to claim 9, wherein a plurality of grid points are defined in the L*a*b* color space, each grid point having a set of grid data defined in the L*a*b* color space, wherein the color conversion table creating program further comprises instructions for:

(f) selecting, for each of the first data sets excluding the third data set, a single grid point whose grid data set is closest to the subject set of first data, the grid points including a black grid point whose grid data is closest to the single set of black color data; and (g) corresponding, to each selected grid point, the second data set corresponding to the first data set that is closest to the subject grid point, and wherein the (e) creating creates the color conversion table based on the grid data sets and the second data sets.

11. The non-transitory computer-readable recording medium according to claim 10, wherein the each grid data set has a lightness value, and wherein the (b) determining determines, as the reference value, the measured lightness value of the single set of black color data when the measured lightness value of the single set of black color data falls within a prescribed range from the lightness value of the grid data set of black grid point.

12. The non-transitory computer-readable recording medium according to claim 9, the color conversion table creating program further comprises instructions for: (h) judging, for each first data set of the first data sets, whether or not the subject first data set represents blue hue, and wherein the (d) determining determines, for each first data set of the first data sets, the subject first data set as the third data set when the (h) judging judges that the subject first data set represents blue hue and the (c) judging judges that the measured lightness value of the subject first data set is smaller than the reference value.

13. The color conversion table creating device according to claim 1, wherein the functional units include a grid point setting unit configured to set a plurality of grid points by dividing the L*a*b* color space into equal segments, each grid point having a set of grid data including a prescribed lightness value.

14. The color conversion table creating method according to claim 5, further comprising setting a plurality of grid points by dividing the L*a*b* color space into equal segments, each grid point having a set of grid data including a prescribed lightness value.

15. The non-transitory computer-readable recording medium according to claim 9, further comprising setting a plurality of grid points by dividing the L*a*b* color space into equal segments, each grid point having a set of grid data including a prescribed lightness value.

* * * * *